UNITED STATES PATENT OFFICE.

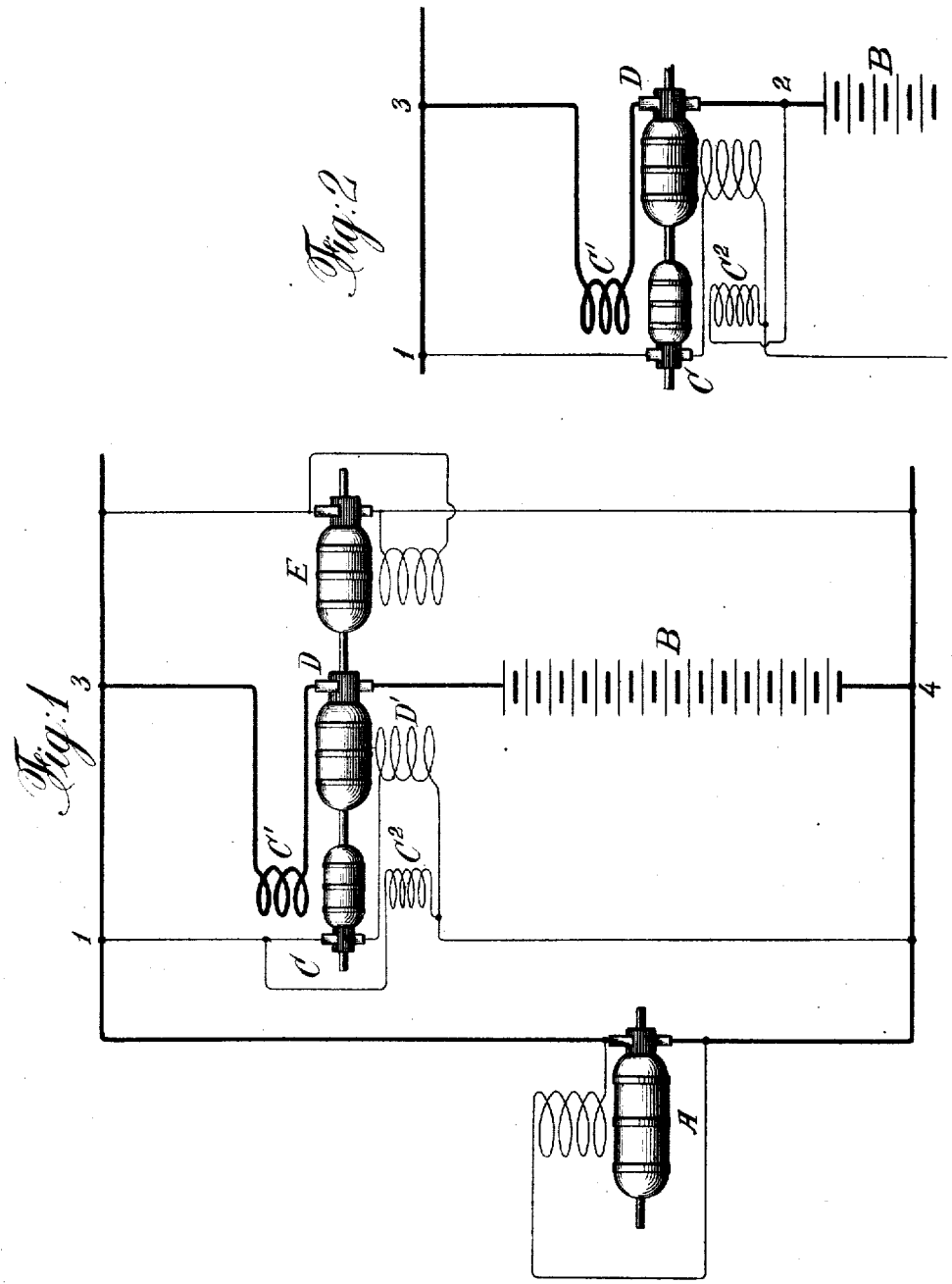

FRANCIS J. WHITE, OF BROOKLYN, NEW YORK, ASSIGNOR TO GOULD STORAGE BATTERY COMPANY, A CORPORATION OF NEW YORK.

ELECTRICAL SYSTEM OF DISTRIBUTION.

No. 915,915.   Specification of Letters Patent.   Patented March 23, 1909.

Application filed January 8, 1906. Serial No. 294,990.

*To all whom it may concern:*

Be it known that I, FRANCIS J. WHITE, a citizen of the United States, residing in Brooklyn, county of Kings, State of New York, have invented certain new and useful Improvements in the Art of Electrical Systems of Distribution, of which the following is a specification.

My invention relates to electrical systems of distribution, and especially to systems in which a storage battery is employed to steady the load on the main generator or to maintain reasonably constant voltage conditions on the system.

The object of my invention is to provide a means for regulating the battery current by automatic regulation of a booster in series with the battery. For many systems of this character that type of booster which is regulated primarily by means of the current changes in the battery circuit has been found, on the whole, most advantageous to employ.

My invention accomplishes the regulation of the booster by this general method, but in a more efficient and accurate manner than has heretofore been accomplished with boosters of this general type.

My invention particularly involves the employment of a regulating or controlling coil for the booster which is in the battery circuit or connected so that its current varies in accordance with the variations of current in the battery circuit, and arranged to regulate the booster voltage by varying the current in a separate circuit containing the booster field winding. Preferably this regulating coil controls the voltage applied to the booster field coil, as by constituting a field winding of a special dynamo in series with the booster field winding. I also provide on this special dynamo a second or shunt winding so that the voltage of the special dynamo is varied in accordance with the sum or difference of the energizing effects of the two windings. By this means I am enabled to provide a booster which is regulated with more accuracy, and much more rapidly, the inductive effects being very much lessened, while the booster field-magnet can be made smaller.

The drawings accompanying this specification diagrammatically illustrate the invention.

Figure 1 shows the invention in one form; Fig. 2 is a diagram of certain parts of the system shown in Fig. 1 in order to illustrate a modification to be hereinafter described.

A represents the main generator of the system. In the case illustrated this is a shunt dynamo, and therefore has a drooping characteristic. It is not essential to the employment of my invention that this dynamo should be a shunt dynamo, although this will probably be found necessary where the battery is in the same station with its generator, because the type of booster employed is only useful where a drooping characteristic is present at the terminals and battery branch.

B indicates the storage battery, D the armature of the booster in series therewith in the branch circuit connected to the circuit of generator A at the points 3 and 4.

E represents a motor whose armature is mechanically connected to the armature of booster D and intended to rotate the same at substantially constant speed. The booster field winding D' is in a special circuit connected across the system.

At C is the armature of a special regulating dynamo or counter machine mechanically connected to the armatures D and E and electrically in series with the booster field winding D'. The current in the booster field winding D' and, therefore, the voltage of the booster is dependent upon the relation between the electro-motive-force or potential difference generated by C and the potential difference between the two sides of the system.

The potential difference of C is regulated by the field windings C' and C². The former is the main regulating winding and is connected directly in the battery circuit, the latter is connected in shunt across the system, so that it varies comparatively little. The winding C² would preferably be designed so that with no current in the battery circuit, and, therefore, no current in the coil C', the voltage of the regulating dynamo C would exactly equal that of generator A. Upon an increase of load on the system, which would cause a drop of potential difference at the points 3, 4, a slight current would develop in the battery circuit. This current would cause the coil C' to act, and would also reduce slightly the current in the coil C². If the coils are wound so that this current in C', on discharge of the battery, has an opposing effect upon the armature C to that of the current in C², then these two changes caused by increase of load on the system will act cumulatively upon the potential difference generated by the armature C thus sending a current through the booster field winding D' in a direction to cause a voltage from the booster in the proper direction to cause an increased current from the battery to meet the increased demands of the working circuit. If, on the other hand, there is a decrease of current in the working circuit from the average condition of equilibrium, then the voltage across the points 3, 4, is increased and current passes in the opposite direction through the coil C' charging the battery, while the current in C² is increased due to the increased voltage. At this time the current in coils C' and C² acts cumulatively to produce voltage in the armature C, and therefore the increased current in C² acts cumulatively with the current in C' with the result that a current is established in the booster field winding in a direction to produce voltage in the booster to assist the charging of the battery and so increase the charging current. By this arrangement but comparatively few turns are required for the regulating coil C' so that inductive effects are reduced to a minimum, and so that the regulation is quickly responsive to changes of load on the system. Moreover, the field winding of the booster may be wound more economically and so the size of its field yoke may be reduced as compared with those systems that attempt to use the ordinary compound wound booster in the battery circuit.

In Fig. 2 I have shown a modification by which I can still further reduce the cost and increase the efficiency of the apparatus. In this case the coil C² instead of being connected across the generator circuit, as shown in Fig. 1, is connected across the battery, the upper end of the coil being connected at the point 2 instead of at the point 1. This only affects the operation in that it increases the regulating effect of the coil C². That coil being responsive to the voltage changes is more greatly affected when connected across the battery because the battery voltage varies more widely than the voltage across the system as a whole.

While I have shown specific modifications of my invention, it will be understood that the same may be modified in many respects without departing from the scope of my invention as set out in the appended claims.

For example, while I prefer to have the coil C' decrease the voltage of the dynamo C on discharge of the battery, as set out in the foregoing explanation, yet there are cases where it may be found desirable to so arrange this coil that it decreases the voltage of the dynamo on charge of the battery.

What I claim as new, and desire to secure by Letters Patent, is:—

1. The combination with a main generator, a battery and booster in a branch circuit, a booster field connected in a separate circuit controlling the E. M. F. of the booster, and a prime regulating coil connected to receive current varying with changes of current in the battery circuit and substantially fully controlling the current in said booster field circuit.

2. The combination with a main generator, a battery and booster in a branch circuit, a booster field controlling the E. M. F. of the booster, means for applying opposing potential differences thereto, and a regulating coil connected to receive current varying with changes of current in the battery circuit, and approximately fully controlling the value of one of said potential differences.

3. The combination with a main generator, a battery and booster in a branch circuit, a booster field controlling the E. M. F. of the booster, means for producing potential difference in series therewith and a prime regulating coil for the same connected to receive current varying with current changes in the battery circuit, said booster field being mainly responsive to said regulating coil.

4. The combination with a main generator, a battery and booster in a branch circuit, a booster field controlling the E. M. F. of the booster, a regulating coil for the same connected to receive current varying with current changes in the battery to which said booster field is mainly responsive, and a second controlling coil for the same in a branch circuit.

5. The combination with a main generator, a battery and booster in a branch circuit, a booster field controlling the E. M. F. of the booster, a regulating coil for the same connected to receive current varying with current changes in the battery said booster field being substantially wholly responsive to said regulating coil and a second controlling coil for the same connected to be affected by changes of E. M. F. of the battery.

6. The combination with a main generator, a battery and booster in a branch circuit, a booster field controlling the E. M. F. of the booster, a regulating dynamo in series therewith and opposing the main generator, a field coil therefor in a branch circuit, and a second field coil therefor connected in the battery circuit.

7. The combination with a main generator, a battery and booster in a branch circuit, a booster field controlling the E. M. F. of the booster, a regulating dynamo in series therewith, a field coil therefor in a branch across the battery terminals, and a second field coil therefor connected in the battery circuit.

In testimony whereof, I have signed my name to this specification, in the presence of two subscribing witnesses.

FRANCIS J. WHITE.

Witnesses:
 EDWIN SEGER,
 RICHARD EYRE.